(12) United States Patent
Lammi

(10) Patent No.: US 6,301,933 B1
(45) Date of Patent: Oct. 16, 2001

(54) METHOD FOR BENDING GLASS SHEETS

(75) Inventor: Petri Lammi, Tampere (FI)

(73) Assignee: Tambest Oy (FI)

( * ) Notice: Subject to any disclaimer, the term of this patent is extended or adjusted under 35 U.S.C. 154(b) by 0 days.

(21) Appl. No.: 09/496,430

(22) Filed: Feb. 2, 2000

Related U.S. Application Data

(62) Division of application No. 09/011,877, filed as application No. PCT/FI96/00439 on Aug. 14, 1996, now Pat. No. 6,076,374.

(30) Foreign Application Priority Data

Aug. 25, 1995 (FI) .................................................. 953999

(51) Int. Cl.[7] ........................ C03B 23/023; C03B 23/027
(52) U.S. Cl. ................................. 65/106; 65/107; 65/291
(58) Field of Search ........................... 65/273, 287, 291, 65/106, 107

(56) References Cited

U.S. PATENT DOCUMENTS

| | | |
|---|---|---|
| 991,025 | 5/1911 | Robier . |
| 2,021,180 | 11/1935 | Galey . |
| 2,223,123 | 11/1940 | Owen . |
| 2,297,315 | 9/1942 | Owen . |
| 3,832,153 | 8/1974 | Bezombes . |
| 4,054,437 | 10/1977 | Ueberwolf et al. . |
| 4,054,438 | 10/1977 | Presta . |
| 4,226,608 | 10/1980 | McKelvey . |
| 4,292,065 | 9/1981 | Nedelec et al. . |
| 4,311,509 | 1/1982 | Reader et al. . |
| 4,318,728 | 3/1982 | Claassen . |
| 4,376,643 | 3/1983 | Kahle et al. . |
| 4,522,641 | * 6/1985 | Hagedorn ............................. 65/291 |
| 4,575,389 | 3/1986 | Halberschmidt et al. . |
| 4,586,946 | 5/1986 | Kramer et al. . |
| 4,773,925 | 9/1988 | Schultz . |
| 4,822,398 | 4/1989 | McMaster et al. . |
| 5,137,562 | 8/1992 | Reunamaki . |
| 5,246,477 | 9/1993 | Kramer . |
| 5,849,057 | 12/1998 | Didelot . |

FOREIGN PATENT DOCUMENTS

| | | |
|---|---|---|
| 228049 | 2/1910 | (DE) . |
| 237064 | 2/1911 | (DE) . |
| 32919 | 12/1910 | (SE) . |

* cited by examiner

Primary Examiner—James Derrington

(57) ABSTRACT

A bending mold for bending glass sheets is provided. The mold comprises a frame having longitudinally parallel side walls and a bottom. Support devices having support surfaces are connected between the side walls. An elongated member is provided on the bottom of the frame and is movable in relation to the frame. Support arms are connected by joints between the support device and the elongated member. Movement of the elongated member twists the support devices about a horizontal twisting center.

9 Claims, 5 Drawing Sheets

METHOD FOR BENDING GLASS SHEETS

Figure 1:
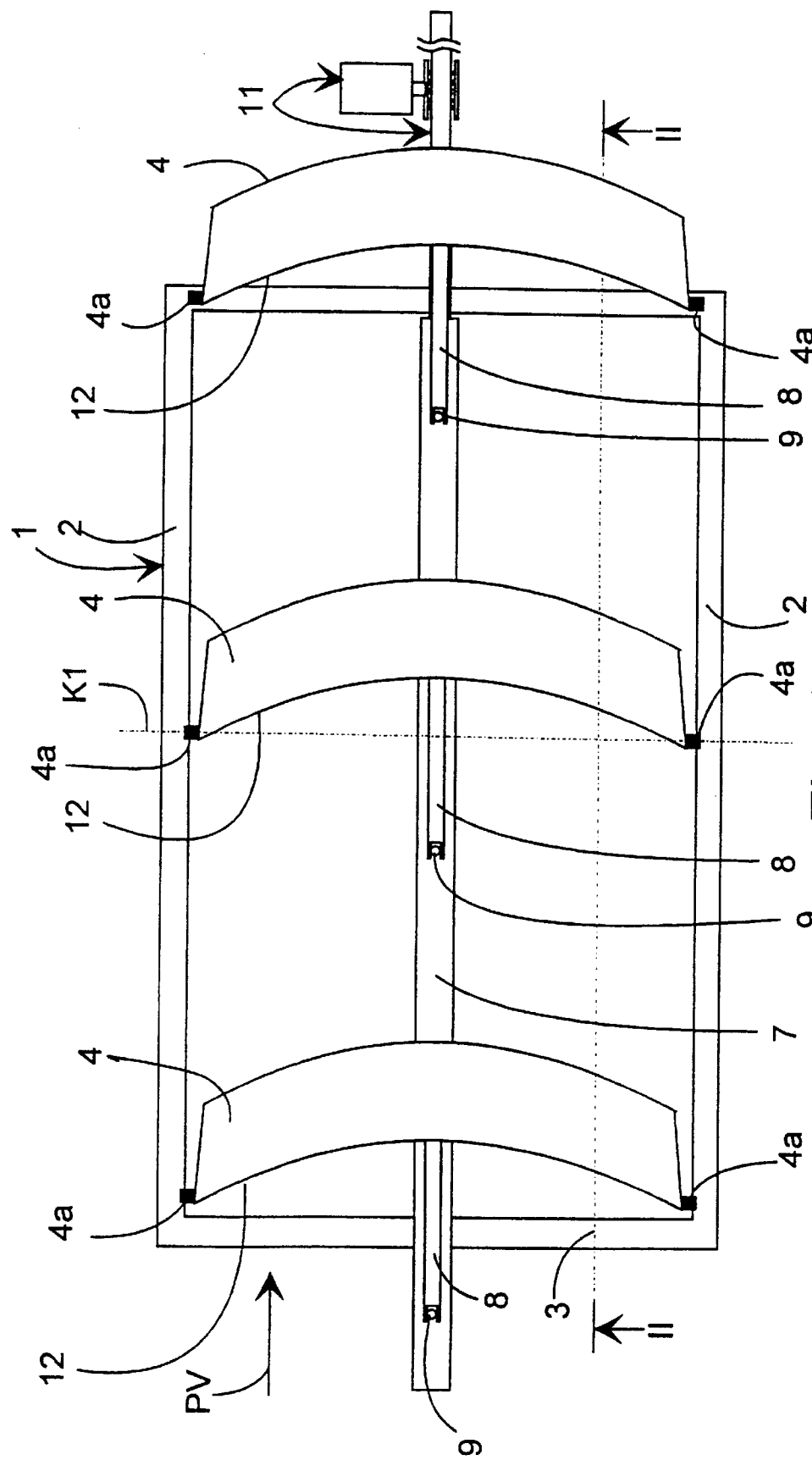

This application is a divisional of application Ser. No. 09/011,877 filed Apr. 17, 1998, now U.S. Pat. No. 6,076,374, which is a national staged of PCT/FI96/00439 filed Aug. 14, 1996.

FIELD OF THE INVENTION

This invention relates to a bending mold for bending glass sheets comprising:
a frame,
support devices in connection with the frame,
the support devices and the frame including means for connecting the frame and the support devices,
the support devices including support surfaces,
the bending mold comprising a sheet like, at least in one of the main planes of the sheet formed to be flexible, and in connection with the support surfaces of the support devices being positioned support part, against whose support surface the glass sheet to be bent is arranged to bend to a bending form determined by the support surfaces of the support devices and the support surface of the support part.

BACKGROUND OF THE INVENTION

Bending molds of this type are known for example from publications SE-32919 and DE-228049. These publications disclose support apparatus mounted in connection with the frame of the bending mold and placed in a detachable manner, but with the functions of the bending mold being fixed in relation to the frame. Support devices for various bending forms have been manufactured for reserve, wherein for a certain bending form support devices having the corresponding support surfaces are placed in connection with the frame. In the apparatus known from the above mentioned publications, on the support devices there is positioned a sheet like support part formed of parallel tubes, on which the glass bends to the bending form determined by the support surfaces of the support devices and the support surface of the support part.

Bending mold solutions known from the above mentioned publications SE-32919 and DE-228049 are advantageous because the same frame of a bending mold can be used in various types of bending forms by changing supporting devices corresponding to each bending form to connect with the frame. The disadvantage, however, is that the reserve of support devices grows considerably since each bending form has to be provided with a support device of its own. An obvious consequence is that a considerable amount of capital is tied up in the support device reserve. Further, the need to plan and control the production increases significantly. Personnel is required to maintain the support device reserve and to transport the support devices, whereby the production costs increase.

SUMMARY OF THE INVENTION

The object of the present invention is to obviate the above presented problems to a great extent and thus to improve the state of art in the field. To attain these objects, the bending mold in accordance with the present invention comprises means for adjusting the position of at least one support device in order to change the vertical projection of the support surface of at least one support device to a bending form desired at a time.

The above presented solution thus provides the advantage that, by means of a single support device, it is possible to perform a plurality of glass sheet formings having different bending forms. Thus, changing of the bending form is implemented by transferring the support device in relation to the frame to a new position: wherein the vertical projection of the support surface, usually in a perpendicular vertical level against the longitudinal direction of the bending mold changes; wherein a sheet-like support part placed on the support surface of the support device, due to its flexibility, adopts the form of the projection, particularly an arch form, and the glass sheet to be bent bends to the bending form converted in this manner. By choosing the basic forms of the support surfaces of the support device, particularly basic arch forms, in a manner that they form a suitable series, it is possible with a few support device series to cover a wide and versatile bending area for the glass sheets.

The bending mold in accordance with the invention thus provides the possibility to perform very individual bending forms, but in a manner that the advantages of serial production are preserved, only by means of changing the position of the support devices. However, the versatile nature of the invention does not lead to costly investments since the support device reserve can be decreased to a fraction compared to the conventional technology.

According to one particularly advantageous embodiment of the invention, means for adjusting the support device, which are placed in connection with the bending mold, are arranged to perform twisting movement around a substantially horizontal twisting center. Thus, if the support surface in the support device is an arch form, increasing or decreasing of the radius of the arch form is obtained by the adjustments of the position, naturally within the scope of the basic arch form. The bending width of the glass sheet can thus be kept constant.

Further, according to one advantageous embodiment of the invention, the means for adjusting the position of the support device, which are in connection with the bending mold, are arranged to perform twisting movement around a substantially vertical twisting center. Thus, the arch form of the support surface of the support device becomes narrower or broader in the vertical projection and the depth of the arch form keeps constant.

Furthermore, according to one advantageous embodiment, the bending mold comprises means for providing both vertical and horizontal twisting of the support device. This solution provides the advantage that both the arch of the bending form and the width of the bending form can be adjusted simultaneously.

Furthermore, according to one advantageous embodiment, where the bending mold comprises two or more support devices, all the support devices are connected to means which they share, in order to adjust the support devices, at least if needed, to a uniform position in relation to the frame.

BRIEF DESCRIPTION OF THE DRAWING(S)

The other depending claims present some advantageous embodiments of the bending mold in accordance with the invention.

Figure 2:
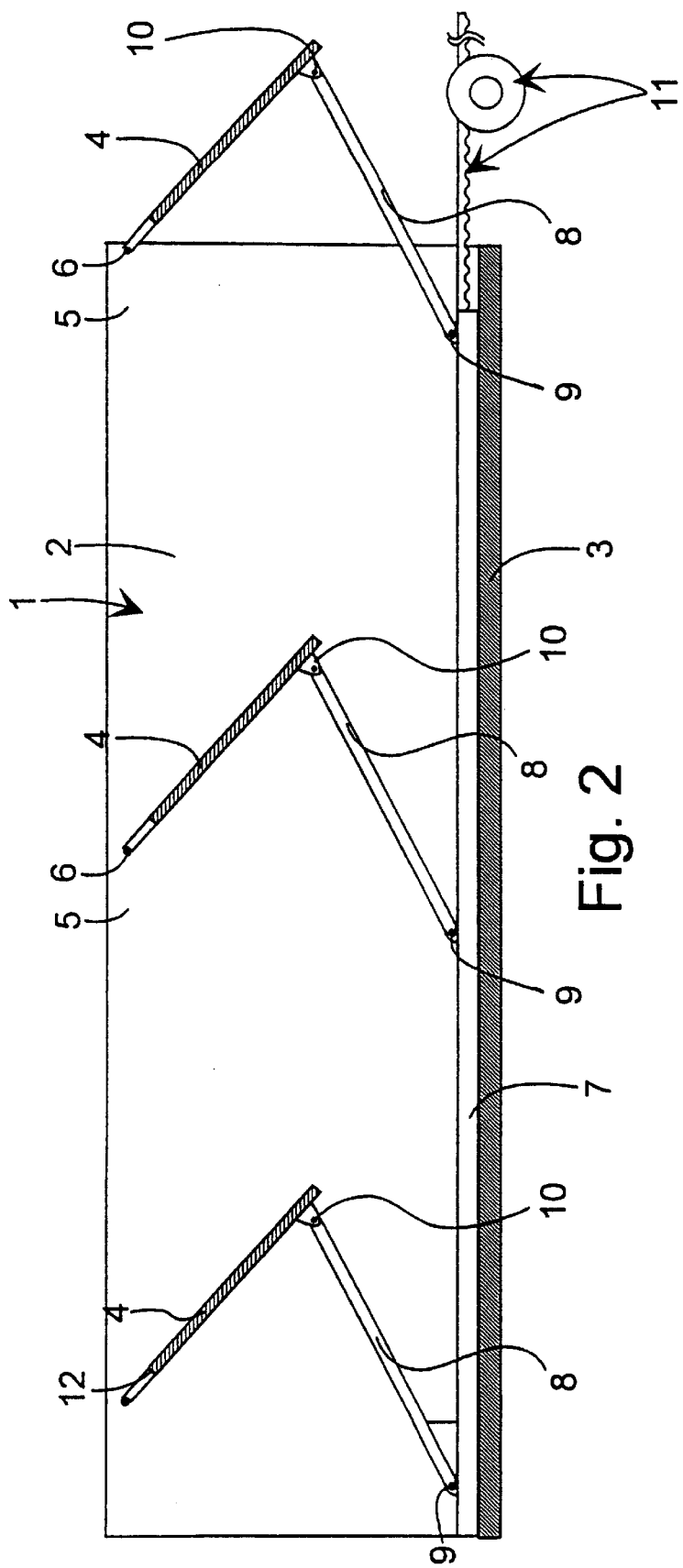
Figure 3:
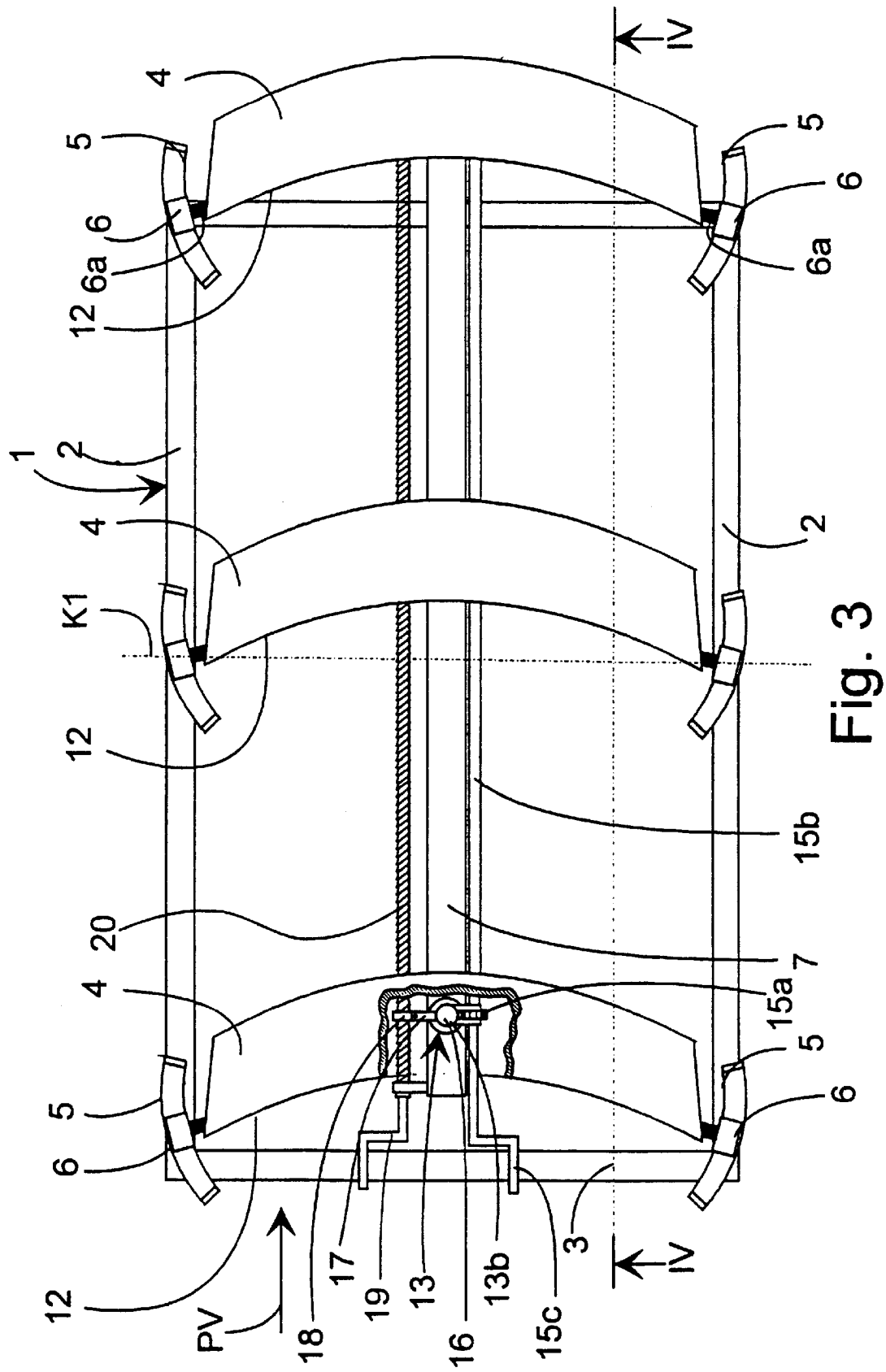
Figure 4:
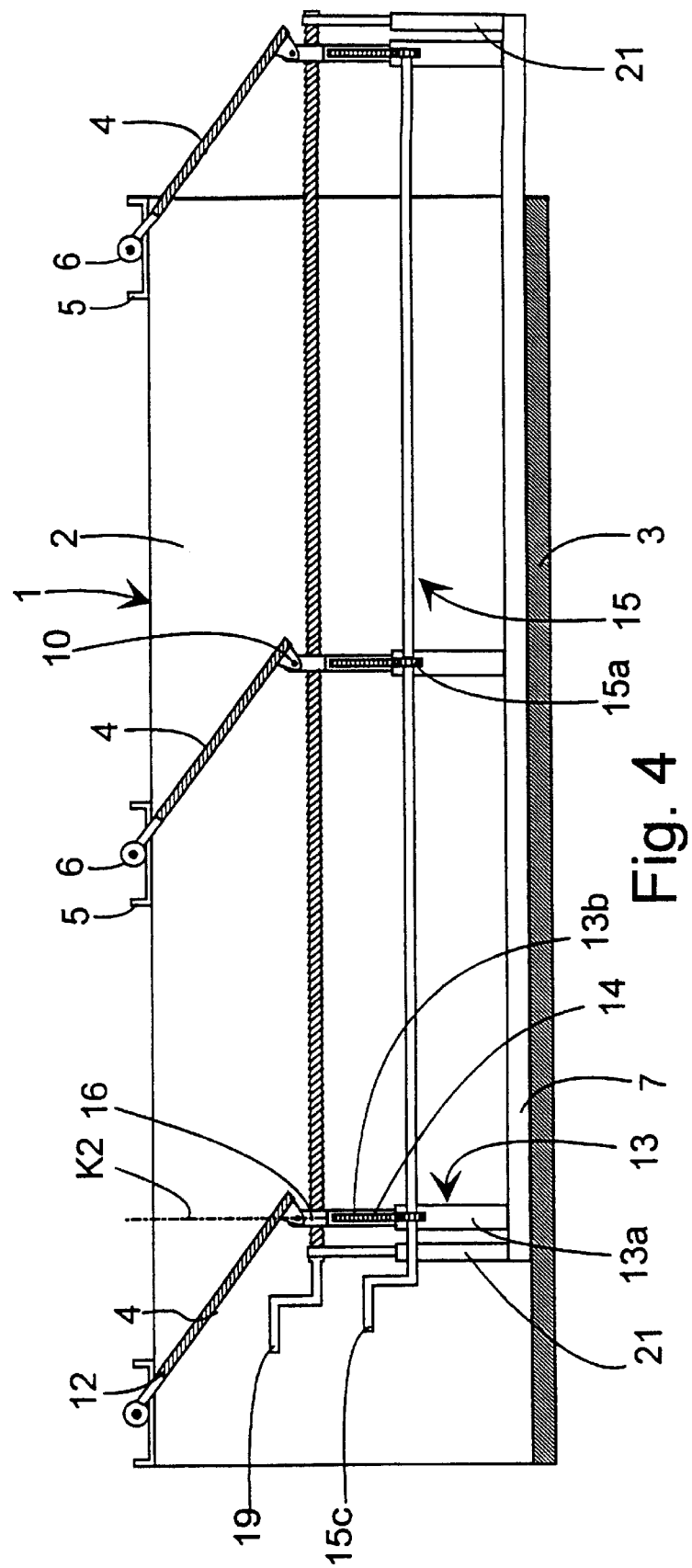
Figure 5:
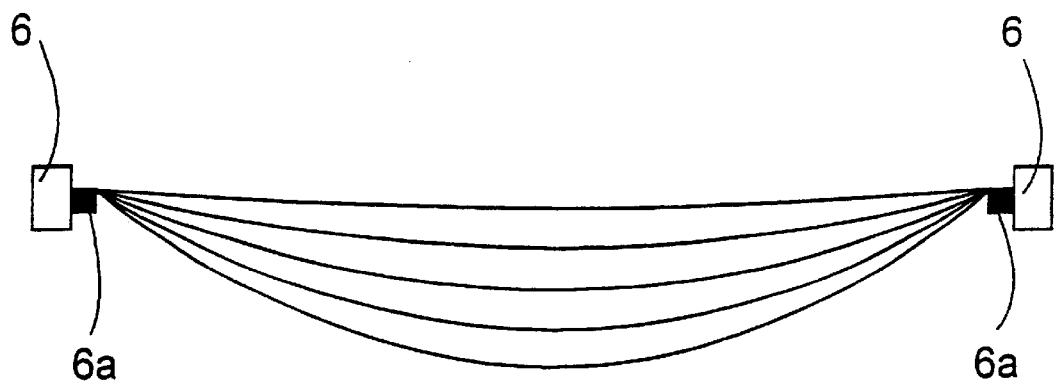
Figure 6:
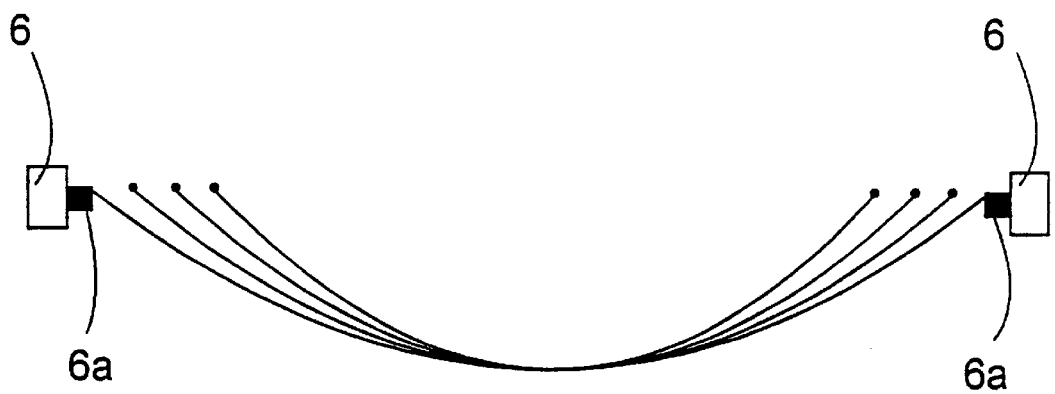

The invention is illustrated in more detail in the following description, with reference to the accompanying drawings illustrating one advantageous embodiment of the bending mold. In the drawings:

FIG. 1 illustrates one embodiment of the bending mold in accordance with the invention, as seen from the top, and FIG. 2 illustrates cut II—II of FIG. 1, FIG. 3 illustrates a second embodiment of the bending mold in accordance with the invention, as seen from the top, FIG. 4 illustrates cut IV—IV of FIG. 3, and FIGS. 5–7 illustrate in a schematic form bending forms obtained by a bending mold in accordance with the invention, wherein the figures illustrate, in a corresponding manner projections of support surfaces in vertical level seen in the longitudinal direction of the mold.

When seen from the top, the bending mold illustrated in FIGS. 1 and 2 comprises a rectangular frame 1, which can, if needed, be equipped with wheels and be fixed in connection with the bending furnace. The bending furnace proper and heating apparatus therein can be constructed by using various methods. A multitude of bending furnace solutions are described e.g. in the patent literature of the field; they are not described in this context in more detail, as they are regarded as an obvious construction alternative by an expert in the field.

Frame 1 can comprise side walls 2 longitudinally parallel with the frame, and a horizontal bottom 3. Support devices 4, the present embodiment having three of them between the side walls 2, after each other parallel in the longitudinal direction of the frame 1, are supported in the upper edge of the side walls 2 of the frame 1 to twist vertically around the horizontal axis, for example by means of projective shaft parts 4a.

Under the support devices 4 in connection with the bottom of the bending mold there is placed an elongate means 7, which substantially extends over the entire length of the bottom 3 of the bending mold. In this means 7, which can have a cross section of an downward directing C-balk, there is coupled supporting arms 8 between each support device 4 and the elongate means 7, wherein the coupling points include on the other hand a joint 9 between supporting arm 8 and the elongate means 7, and on the other hand a joint 10 between the support device 4 and the supporting arm 8. The elongate means 7 is transferred in relation to the frame 1, for example by means of a motor-driven toothed bar-gear wheel combination 11, wherein vertical twisting of the support devices 4 is obtained around a horizontal twisting center K1 (FIG. 1, shaft parts 4a). Thus, there is then obtained a projection flock of support surfaces 12, illustrated in FIG. 5 when seen from the direction of PV of FIG. 1 (and also FIG. 3).

FIGS. 3 and 4 show another embodiment of the bending mold according to the invention, by means of which it is possible to implement the twisting around the horizontal axis in accordance with FIGS. 1 and 2, and if needed, also a cophasal twisting of the support devices 4 around a vertical shaft (twisting center K2). In this situation, the elongate means 7 is arranged freely to move in relation to the bottom 3 and freely movable in relation to the binding form, during adjustments of the support devices 4.

In the elongate means 17, at each support device, telescopic height adjusting means 13 are placed, whose first part 13a is composed of a vertical tube, or the like, coupled to the elongate means, and a second part 13b, further up, is of balk or the like equipped with a toothed-bar 14, wherein the second part 13b is arranged vertically to move in relation to the first part 13a. Vertical transfer of the second part 13b takes place by means of a gear wheel 15 pivoted to the first part 13a. Gear wheels 15a communicating with the toothed bar 14 are used on a horizontal twisting bar 15b combining different height adjusting means 13, for example by using a crank 15c. By means of a construction described above there is implemented a functional entirety in connection with the second embodiment in accordance with FIGS. 1 and 2, in a manner that the height adjusting means 13 affect the support devices 4 effecting them to twist.

In the upper part of the height adjusting means 13 there are vertical extensions 16 pivoted at their lower part to twist around a vertical axis (twisting center K2) supported by the edge of the vertical, second part 13b. At their upper part, the vertical extensions 16 are joined by means of a joint 10 to the support devices 4. With reference to a partial cross diagram shown particularly in FIG. 3, each vertical extension 16 comprises a twisting arm 17 joint to a threaded sleeve 18. The threaded sleeves 18 are coupled together by means of a twisted bar 20 used by a crank 19. The twisted bar 20 is supported to the elongate means 7 by means of telescopically operating support balks 21.

First support means 5, in this case horizontal support arches, meet each other in pairs in the upper edge of the both side walls 2 in the frame 1, in the crosswise direction of the frame 1. The support devices 4 in their turn have second support means 6, in this case rolls 6 supported by the shaft 6a and communicating with the support arches 5. The combination 5, 6 of support arch and roll can also be a combination of an arched toothed bar and a gear wheel. The second support means 6 are positioned in the upper part of the support means 4 to project from both side edges of the support means 4.

By means of the arrangement presented above, it is possible by twisting the twisting bar 20 to provide a reaction in which the support devices 4 twist around the vertical twisting center K2 passing through joints 10, wherein the second support means 6 are transferred in the arch controller formed by the first support devices 5 in a corresponding manner. The above described method provides a projection flock shown in FIG. 6 as seen from the direction PV of FIG. 3.

Figure 7:
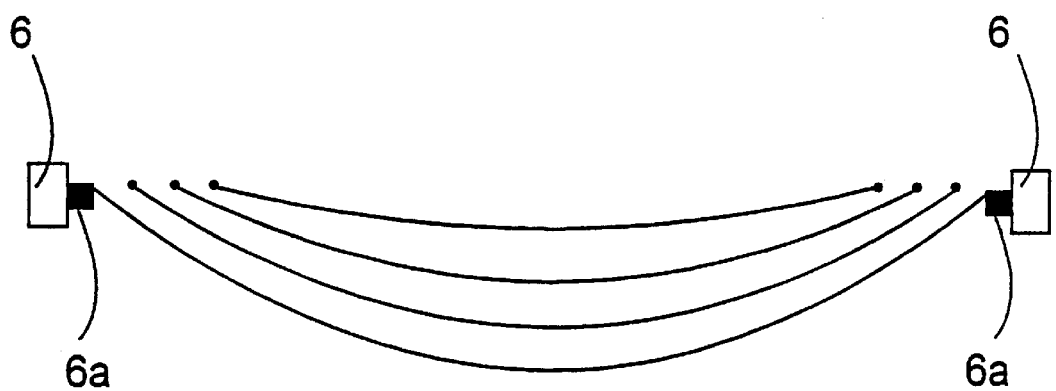

Further, FIG. 7 illustrates some options to implement both above mentioned adjustments simultaneously.

The support devices 4 have, for example, a configuration of steel sheets in which a suitable arch form for the support surface 12 has been formed. When on top of these support surfaces there are placed, for example, flexible sheets of prior art, there is obtained a bending form corresponding the projection flock part in accordance with the above mentioned construction, which is determined by a vertical projection of the support surfaces 12 together with a flexible sheet placed upon it, not shown in the figures.

It is obvious that a bending mold according to the invention can be modified in various ways, wherein the above presented functions, or if needed, only a part of them are obtained. Thus, it is for example possible to form the support devices 4 different as for the form of the support surfaces 12, wherein novel, surprising bending forms are obtained. In addition, if required, one or some of the support devices 4 can be locked in an unmovable manner in relation to the frame 1 and to perform above mentioned adjustments only relating to one or some support devices 4. The support devices 4 are easy to change in connection with the bending mold by detaching the joint 10, and by lifting the support devices 4 away from the support of the first support means 5, by placing in a corresponding manner new support devices 4 equipped with a different type of support surface 12 to connection with the frame 1 of the bending mold. It is particularly advantageous to form a specific series of basic arch forms of support surfaces 12, wherein by means of a few support device series it is possible to cover a broad and versatile bending form area, particularly for substantially cylindrical glass form bendings.

In this specification the terminology used is "horizontal", "vertical" and "longitudinal" in the normal operating position of the bending form, where it substantially horizontally passes through the bending furnace to various departments or is in a department in the horizontal position. Although the bending form in accordance with the invention is in this context treated solely as an application related to bending of glass sheets, the invention can be applied also in so-called bending tempering by equipping the sheet formed or the like support part with tempering nozzle unit.

What is claimed is:

1. A method for bending glass sheets in a bending mold including a frame and support devices having support surfaces and being connected to the frame, said method comprising the steps of:

adjusting at least one of the support devices to change a vertical projection of the support surface of the respective support device prior to the bending stage to correspond to the bending form desired at the time;

performing a twisting movement of the support device around a substantially horizontal twisting center;

arranging a glass sheet to be bent on a flexible sheet provided on the supporting surfaces; and bending said glass sheet.

2. A method according to claim 1 wherein said adjusting step includes performing a twisting movement of the support device around a substantially vertical twisting center.

3. A method according to claim 1 wherein said adjusting is performed by adjusting means.

4. A method according to claim 1 wherein at least two support devices are provided, positioned one after the other in a longitudinal direction of the frame and wherein a means for adjusting is provided, which is common to all the support devices.

5. A method according to claim 4 wherein the means for adjusting comprises a support arm connected at one end via a joint to the support device and at another end via a second joint to an elongated member, the elongated member being positioned on a bottom of the frame and wherein the support devices are connected to the frame via horizontal shaft.

6. A method according to claim 5 further comprising transferring the elongated member in a longitudinal direction of the frame by transferring means.

7. A method according to claim 3 wherein the means for adjusting comprises an elongated member freely movable along a bottom of the frame and height adjusting means connected to the elongated member and the support device, means for twisting the support devices about a horizontal twisting center and means for twisting the support device about a vertical twisting center being connected to the height adjusting means.

8. A method according to claim 1 wherein each support device is supported at its connection to the frame by a first support means in the frame and a second support means in connection with the support device, the first and second support means being arranged to allow twisting movement about a vertical twisting center.

9. A method according to claim 8 wherein the first support means is an arch connected to the frame and the second support means is a roller connected to the support device and arranged in the arch.

* * * * *